(No Model.)

F. BEX & E. F. HEUNSCH.
DUMP CART.

No. 387,850. Patented Aug. 14, 1888.

WITNESSES.
C. S. Trevitt.
A. G. Heufman.

INVENTORS.
Frederick Bex and E. F. Heunsch.
By Wm. H. Bates,
Attorney.

UNITED STATES PATENT OFFICE.

FREDERICK BEX AND EDMUND F. HEUNSCH, OF WASHINGTON, DISTRICT OF COLUMBIA.

DUMP-CART.

SPECIFICATION forming part of Letters Patent No. 387,850, dated August 14, 1888.

Application filed March 7, 1888. Serial No. 266,402. (No model.)

*To all whom it may concern:*

Be it known that we, FREDERICK BEX, a subject of the Queen of Great Britain, and EDMUND F. HEUNSCH, a citizen of the United States, residing at Washington, in the District of Columbia, have invented certain new and useful Improvements in Dump-Carts; and we do hereby declare the following to be a full, clear, and exact description of the invention, such as will enable others skilled in the art to which it appertains to make and use the same.

Our invention has relation to improvements in dumping-carts; and the object is to provide a cart mounted on a crank-axle, so that the body will be at convenient height for being easily loaded, and that the contents or load may be dumped and discharged without the usual danger of breaking and mutilation. We also provide an improved keeper-bar to lock the front end of the cart-body down on the shafts, and an improved rest-bar.

Our invention consists in the novel construction of parts and their combinations, as will be hereinafter fully specified, and specially as the same is pointed out and distinctly claimed.

We have fully illustrated our improvements in the accompanying drawings, wherein—

Figure 1:
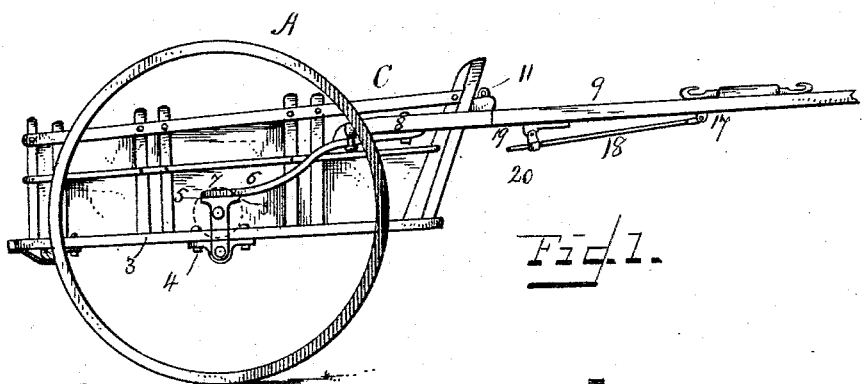
Figure 2:
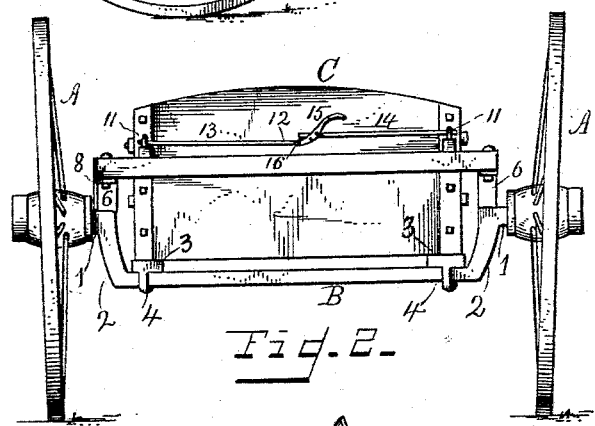
Figure 3:
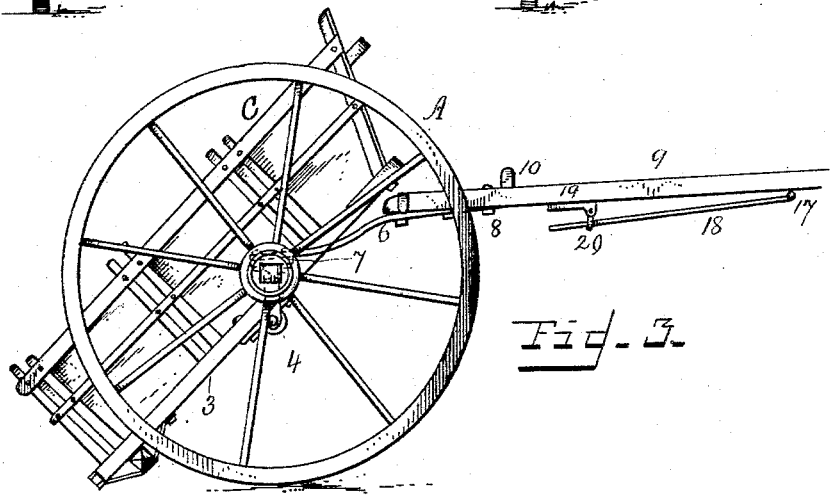

Figure 1 is a side elevation of a cart of our improved construction, the spokes of the wheel being omitted from the illustration and the hub shown in dotted line. Fig. 2 is a front view in elevation. Fig. 3 is a side view showing the body of the cart in "dumped" position.

Reference being had to the drawings, A designates the wheels of the cart, which are of the usual construction, and are mounted on the spindles 1 of the crank-axle B. The cranks 2 of the bail of the axle are of such length as to bring the body of the cart low enough to be convenient for loading, and so that the load may be dumped without breaking such materials as might with a higher vehicle be broken.

C designates the box or body of the cart, to the under face of the side pieces, 3, of which are bolted bearings 4, mounted to turn on the main bar of the bail of the axle, substantially as shown in the drawings. The top part of the cranks 2 of the bail of the axle are extended laterally, as at 5, and on these are secured the rear ends of the shaft-irons 6, as shown at 7. These shaft-irons are curved upward and have their forward ends bolted to the rear ends of the shafts, as at 8. The curved construction of the shaft-irons throws the line of draft direct with the weight, and, being rigidly secured to the axle, the bail is held vertical and the body from rocking. Across the shafts 9 in front of the body is secured a cross-piece, 10, in which are fixed staples 11, which receive the ends of the keeper-bar 12, and thus the body is held down and kept from dumping. This keeper-bar 12 consists of two pieces 13 14. To the inner end of one of the pieces is pivoted a lever, 15, having the end pivoted to the end of the other piece or bar, as shown at 16, by which arrangement the ends of the keeper-bar can be withdrawn from the staples on the cross-piece of the shaft, the operation being to raise the handle of the lever. A reverse movement, when the keeper-bar is laid on the front, will force the ends under the staples and holding the body from dumping. On the under side of one of the shafts is secured a staple, 17, in which is pivoted a rest-bar, 18, adapted to be swung up and lay parallel with the shaft, or to be let down and stand perpendicular to keep the weight off the animal's back during loading, or while standing with the cart loaded. To hold the rest-bar under the shaft, a lug, 19, is secured to the under side of the shaft, and to this lug is pivoted a hook, 20, in which the free end of the rest-bar is laid when not in use, as seen in Fig. 1 of the drawings.

What we claim is—

1. In a dump-cart, the combination, with a crank-axle, of a body provided with bearings arranged on the bail of the axle and to turn thereon, substantially as described.

2. In a dump-cart, the combination, with a crank-axle, of a dumping-body having bearings secured to the under side of the side pieces of the body and mounted on the bail of the axle to turn thereon, substantially as described, and for the purposes set forth.

3. In a dump-cart, the combination of the crank-axle, the body mounted to turn on bearings on the bail of the axle, and shafts having their rear ends secured to the top or side of the crank of the axle, substantially as described, and for the purpose set forth.

4. The combination, with the crank-axle of a dump-cart, of shafts having their rear ends rigidly secured to the top or upper sides of the crank of the axle, substantially as described, and for the purposes set forth.

5. The combination, in a dump-cart of a crank-axle and shafts having shaft-irons secured on their rear ends and to the upper part of the crank of the axle, said shaft-irons being secured on the upper faces of said cranks and formed to curve upward from said attachment, substantially as described, and for the purpose set forth.

In testimony whereof we affix our signatures in presence of two witnesses.

FREDERICK BEX.
E. F. HEUNSCH.

Witnesses:
A. B. KELLY,
A. B. CLAXTON.